United States Patent
Zhu (10) Patent No.: US 10,281,790 B2
(45) Date of Patent: May 7, 2019

(54) ANTI-GLARE DEVICE AND REARVIEW MIRROR

(71) Applicant: BOE TECHNOLOGY GROUP CO., LTD., Beijing (CN)

(72) Inventor: Lin Zhu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/671,741

(22) Filed: Aug. 8, 2017

(65) Prior Publication Data

US 2018/0045987 A1 Feb. 15, 2018

(30) Foreign Application Priority Data

Aug. 9, 2016 (CN) .......................... 2016 1 0649480

(51) Int. Cl.
*G02F 1/137* (2006.01)
*B60R 1/02* (2006.01)
(Continued)

(52) U.S. Cl.
CPC ................ *G02F 1/137* (2013.01); *B60R 1/02* (2013.01); *B60R 1/083* (2013.01); *B60R 1/088* (2013.01);
(Continued)

(58) Field of Classification Search
CPC ................ G02F 1/137; G02F 1/13318; G02F 1/133553; G02F 1/13439;
(Continued)

(56) References Cited

U.S. PATENT DOCUMENTS 5,247,378 A * 9/1993 Miller ................ G02F 1/13306
349/18
5,617,109 A * 4/1997 DeJule .............. G02F 1/134309
345/100
(Continued)

FOREIGN PATENT DOCUMENTS

CN 201400132 Y 2/2010
CN 201842015 U 5/2011
(Continued)

OTHER PUBLICATIONS

Chinese office action dated Nov. 28, 2017 for corresponding application CN 201610649480.3 with English translation attached.

*Primary Examiner* — Hoan C Nguyen
(74) *Attorney, Agent, or Firm* — Nath, Goldberg & Meyer; Joshua B. Goldberg (57) ABSTRACT

An anti-glare device comprising: a first electrode and a second electrode configured to be opposite to each other; an anti-glare layer provided between the first electrode and the second electrode; and a reflector layer provided on the second electrode, wherein the anti-glare layer comprises a plurality of deflection molecules, which are capable of switching between an ordered deflection and a disordered arrangement when different voltage differences are applied between the first electrode and the second electrode; and the reflector layer is configured to reflect a light passing through the first electrode and transmitting through the anti-glare layer. In the anti-glare device, the multi-stable liquid crystal molecules or the Bi-stable liquid crystal molecules have a property of ordered arrangement during power on and disordered arrangement during power off, whether or not performing anti-glare function can be automatically switched, and an automatic partition control may be realized as well.

18 Claims, 4 Drawing Sheets

(51) Int. Cl.
  *B60R 1/08* (2006.01)
  *G02F 1/1335* (2006.01)
  *G02F 1/1343* (2006.01)
  *G02F 1/133* (2006.01)
  *G02F 1/135* (2006.01)

(52) U.S. Cl.
  CPC ........ *G02F 1/1343* (2013.01); *G02F 1/13318* (2013.01); *G02F 1/13439* (2013.01); *G02F 1/133502* (2013.01); *G02F 1/133553* (2013.01); *G02F 2001/1352* (2013.01); *G02F 2001/13312* (2013.01); *G02F 2001/13756* (2013.01); *G02F 2202/12* (2013.01); *G02F 2202/13* (2013.01); *G02F 2202/14* (2013.01)

(58) Field of Classification Search
  CPC . G02F 2001/13312; G02F 2001/13756; B60R 1/088
  See application file for complete search history.

(56) References Cited

U.S. PATENT DOCUMENTS

| | | | | |
|---|---|---|---|---|
| 5,784,141 | A * | 7/1998 | Chen | G02F 1/133753 349/163 |
| 6,330,047 | B1 * | 12/2001 | Kubo | G02F 1/133555 349/110 |
| 6,379,013 | B1 * | 4/2002 | Bechtel | B60Q 1/1423 359/601 |
| 6,657,767 | B2 * | 12/2003 | Bonardi | B60Q 1/2665 359/265 |
| 2009/0033863 | A1 * | 2/2009 | Blum | A61F 2/14 351/159.34 |

FOREIGN PATENT DOCUMENTS

| | | |
|---|---|---|
| CN | 202186330 U | 4/2012 |
| CN | 205989698 U | 3/2017 |
| DE | 2416172 A1 | 10/1975 |
| EP | 2680067 A1 | 1/2014 |

* cited by examiner

ANTI-GLARE DEVICE AND REARVIEW MIRROR

CROSS-REFERENCE TO RELATED APPLICATION

The present application claims priority to Chinese Patent Application No. 201610649480.3 filed on Aug. 9, 2016, the disclosure of which is hereby incorporated by reference in its entirety.

TECHNICAL FIELD

The present disclosure relates to the field of display technology, more particularly, to an anti-glare device and a rearview mirror.

BACKGROUND ART

A most safety threat of night driving is the problem in sight, a common rearview mirror may directly reflect intense light irradiated from a rear vehicle into the driver's eyes, the glare light may directly affect the driver's vision, thus a safety threat of driving may be caused. In order to reduce the risk and eliminate the safety threat of night driving, it is important to prevent the glare of the light from a rear vehicle.

Most of the existing rearview mirrors have a configuration of double reflectivity, and in most of the existing anti-glare solutions, the glare is suppressed by manual adjustment according to the light principle, that is, when the driver thinks the reflected light is too intense and glare, the driver may manually pull the angle adjusting rod of the rearview mirror to change the angle of the rearview mirror, and the reflectivity of the mirror surface becomes smaller, thus the light intensity can be weakened. With the integration of functions, the rearview mirror may be integrated with a display screen to display a navigation map or other graphics, in a case that the angle of the rearview mirror is adjusted to prevent glare, due to the light reflected by the rearview mirror and the refraction of the front surface glass of the display screen, the image viewed by the driver from the display screen may be distorted. Therefore, since a user is required to manually adjust the angle of the rearview mirror to prevent glare, the operation convenience is poor. Moreover, in a case that the rearview mirror is integrated with a display screen, display effect of the display screen may be influenced during preventing glare.

Therefore, realizing anti-glare effect by automatic adjustment and ensuring the display effect of the display screen during preventing glare in a case that the rearview mirror is integrated with a display screen have become a technical problem to be solved urgently.

SUMMARY

In view of the above problem to be solved in the prior art, the present disclosure provide an anti-glare device and a rearview mirror, which can partially solve the problem of realizing anti-glare effect by automatic adjustment.

A solution adopted to solve the above problem is an anti-glare device comprising: a first electrode and a second electrode configured to be opposite to each other; an anti-glare layer provided between the first electrode and the second electrode; and a reflector layer provided on the second electrode, wherein the anti-glare layer comprises a plurality of deflection molecules, which are capable of switching between an ordered deflection and a disordered arrangement when different voltage differences are applied between the first electrode and the second electrode; and the reflector layer is configured to reflect a light passing through the first electrode and transmitting through the anti-glare layer.

Optionally, when the voltage difference between the first electrode and the second electrode is zero, the deflection molecules are in a disordered arrangement, light irradiated on the anti-glare device is scattered; when the voltage difference between the first electrode and the second electrode is not zero, the deflection molecules are orderly deflected, light irradiated on the anti-glare device transmits through the anti-glare layer and is reflected by the reflector layer.

Optionally, the deflection molecules are Bi-stable liquid crystal molecules.

Optionally, the deflection molecules are multi-stable liquid crystal molecules, and the greater the voltage difference between the first electrode and the second electrode is, the greater the deflection angles of the multi-stable liquid crystal molecules are.

Optionally, the anti-glare device further comprises a photosensitive device and a control circuit connected with the photosensitive device, each of the first electrode and the second electrode is connected with the control circuit, current of the photosensitive device changes in a same direction as a light intensity sensed by the photosensitive device, and the control circuit outputs a reverse pulse voltage with respect to an amplitude of the current of the photosensitive device.

Optionally, the control circuit comprises a control chip and a relay connected with the control chip, an input terminal of the control chip is connected to the photosensitive device, an output terminal of the relay serve as an output terminal of the control chip, and the first electrode or the second electrode is connected to the output terminal of the relay.

Optionally, the first electrode is divided into a plurality of separate light receiving regions, and the anti-glare layer is divided into a plurality of adjustment regions corresponding to the light receiving regions, each of the light receiving regions is provided with a photosensitive device, and the control circuit is configured to control the deflection molecules in the plurality of adjustment regions individually.

Optionally, a plurality of photosensitive devices are provided for each of the light receiving regions, and the plurality of photosensitive devices are uniformly arranged at boundaries of the light receiving region.

Optionally, the anti-glare device further comprises a timer, which is connected with the relay and configured to switch the relay off after the relay continuously supplies power for a set time period.

Optionally, the set time period of the timer is in a range of 3-10 s.

Optionally, the timer switches the relay off after a delay of 1-4 s after the relay continuously supplies power for the set time period.

Optionally, the reflector layer comprises reflector blocks and transmittance blocks which are provided in a same layer and spaced, and the reflector layer is provided on any surface of the second electrode.

Optionally, the photosensitive device is a photosensitive resistor, and an area of the photosensitive resistor is 2 μm*2 μm.

Optionally, the first electrode and the second electrode are formed of a transparent conductive material, and the transparent conductive material includes indium tin oxide.

Optionally, a thickness of the anti-glare layer is in a range of 5-30 μm.

A solution adopted to solve the above problem is a rearview mirror comprising the above anti-glare device.

Optionally, the rearview mirror further comprises a display screen, wherein the anti-glare device is provided at a display side of the display screen.

This disclosure has the following advantages: in the anti-glare device in this embodiment, the multi-stable liquid crystal molecules or the Bi-stable liquid crystal molecules have a property of ordered arrangement during power on and disordered arrangement during power off, whether or not performing anti-glare function can be automatically switched, and an automatic partition control may be realized as well, which is especially suitable for the anti-glare application of a rearview mirrors.

BRIEF DESCRIPTION OF THE DRAWINGS

wherein.

11—first electrode; 12—second electrode; 13—anti-glare layer; 14—package frame; 15—first base; 16—second base; 17—power supply; 18—photosensitive device; 19—reflector layer; 21—light source; and 22—eye.

DETAILED DESCRIPTION OF THE EMBODIMENTS

In order to make a person skilled in the art better understand the solutions of the present disclosure, an anti-glare device and a rearview mirror of the present disclosure will be described in detail below in conjunction with the accompanying drawings and specific embodiments.

First Embodiment:

This embodiment provides an anti-glare device, which not only can effectively prevent glare but also can realize a good view effect of the rearview mirror.

Figure 1:
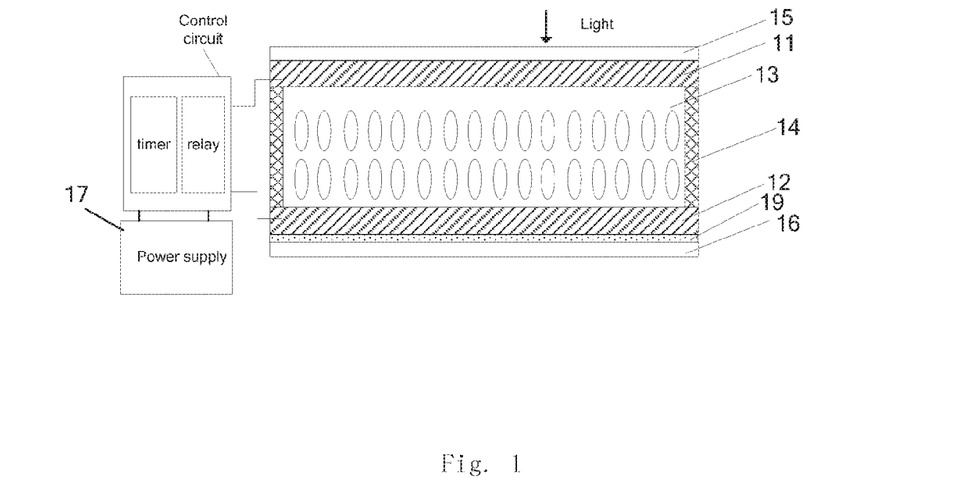
FIG. 1 is a top structural diagram of an anti-glare device of a first embodiment in the present disclosure.

As shown in FIG. 1, the anti-glare device comprises: a first electrode 11 and a second electrode 12, which are configured to be opposite to each other; an anti-glare layer 13 provided between the first electrode 11 and the second electrode 12; and a reflector layer 19 provided on an outer side of the second electrode 12. The anti-glare layer 13 comprises a plurality of deflection molecules, which are capable of switching between an ordered deflection and a disordered arrangement when different voltage differences are applied between the first electrode 11 and the second electrode 12; light irradiated into the anti-glare layer 13 can be scattered by the deflection molecules in a disordered arrangement, or can transmit through the deflection molecules in an ordered arrangement and is reflected by the reflector layer 19, so that the light irradiated on the anti-glare device is reflected or transmitted, thus automatic switch of anti-glare is realized. In FIG. 1, the reflector layer 19 is provided at an outer side of the second electrode 12, and light is irradiated into the anti-glare layer 13 from the first electrode 11 side, alternatively, the reflector layer 19 may be provided at an outer side of the first electrode 1, in this case, incident direction of the light need to be changed, that is to say, the first electrode 11 and the second electrode 12 are symmetrically provided and may be exchanged. In this embodiment, the first electrode 11 and the second electrode 12 are plate electrodes.

Furthermore, in order to realize the reflection or the transmittance, the reflector layer 19 may be provided on either surface of the first electrode 11 or the second electrode 12 in the anti-glare device, and in this embodiment, taking the reflector layer 19 being provided at an outer side of the second electrode 12 as an example, the reflector layer 19 comprises reflection blocks and transmittance blocks which are provided in a same layer and spaced (which are not specifically shown in FIG. 1), the reflection blocks may reflect light irradiated thereon, the transmittance block may transmit light irradiate thereon, thus a portion of the light transmitted through the anti-glare layer 13 can be reflected and the other portion of the light transmitted through the anti-glare layer 13 can transmit, facilitating various application occasions of the anti-glare device. The reflection blocks and the transmittance blocks are preferably formed by discontinuously evaporating metal material to realize the reflection and transmittance, or are formed of polymeric materials to realize the reflection and transmittance.

Figure 3:
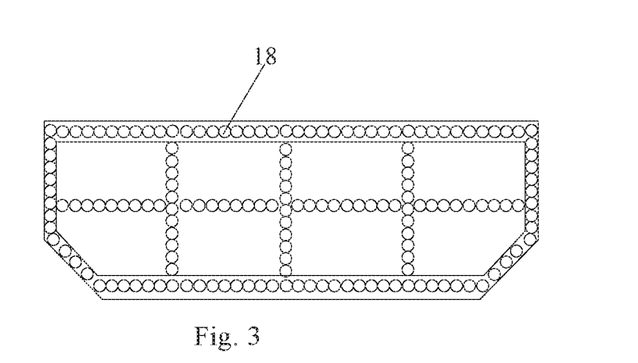
FIG. 3 is a front cross sectional diagram of divided regions of the anti-glare device of a second embodiment.

In the anti-glare device, the anti-glare layer 13 is a liquid crystal layer, the deflection molecules are multi-stable liquid crystal molecules which can maintain deflection at multiple deflection angles ranged from 0-180 degree, and can deflect at different angles depending on various voltages so as to realize switch between fog states and a completely transparent state. As shown in FIG. 3, the multi-stable liquid crystal is packaged into a closed space enclosed by a package frame 14, the first electrode 11 and the second electrode 12. When the voltage difference between the first electrode 11 and the second electrode 12 is zero, the multi-stable liquid crystal molecules are in a disordered arrangement, light irradiated on the anti-glare device is scattered, so that anti-glare can be realized; when the voltage difference between the first electrode 11 and the second electrode 12 is not zero, the multi-stable liquid crystal molecules are orderly deflected, and the greater the voltage difference is, the greater the deflection angles of the multi-stable liquid crystal molecules are, light irradiated on the anti-glare device transmits through the anti-glare layer 13 and is reflected by the reflector layer 19. Therefore, control of the anti-glare can be realized through change in the states of multi-stable liquid crystal molecules.

The multi-stable liquid crystal molecules are characterized in that: the multi-stable liquid crystal molecules are applied with pulse voltage and can maintain state, that is, the multi-stable liquid crystal molecules may response and deflect when an applied voltage reaches a set threshold, and may maintain state even if the voltage is removed (this state can be maintained for several days in normal, and the maintaining time can be varied depending on doping properties). Therefore, here, the first electrode 11 and the second electrode 12 are supplied with a pulse voltage, direction of which may be set arbitrarily, as long as presence and absence of a voltage difference can be controlled between the first electrode 11 and the second electrode 12, that is, a front side and a back side of the anti-glare device may be exchanged in a practical application. Moreover, a pulse voltage can be stopped to supply to the multi-stable liquid crystal molecules when the pulse voltage reaches a set value. For example, in a case that the second electrode 12 is a common electrode, V1 and V2 indicate voltages applied to the first electrode 11 and the second electrode 12 respectively, when a voltage difference between the first electrode 11 and the second electrode 12 is larger than a threshold voltage of the multi-stable liquid crystal material, the multi-stable liquid crystal molecules deflect, allowing light to transmit therethrough, which is equivalent to an anti-glare-off mode; and when a voltage difference between the first electrode 11 and the second electrode 12 is smaller than the threshold voltage of the multi-stable liquid crystal material, the multi-stable liquid crystal molecules are in a disordered arrangement, and light irradiated into the anti-glare layer is scattered, which is equivalent to an anti-glare-on mode.

Above multi-stable liquid crystal molecules may deflect at various angles under various voltages, so as to realize different light transmittance effects. Alternatively, the multi-stable liquid crystal molecules may be Bi-stable liquid crystal molecules, in this case, the Bi-stable liquid crystal molecules may orderly deflect when a voltage is applied thereto to allow light to be reflected or may be disorderly arranged when no voltage is applied thereto to allow light to be scattered. When the voltage difference between the first electrode and the second electrode is zero, the Bi-stable liquid crystal molecules are in a disordered arrangement, light irradiated on the anti-glare device is scattered; when the voltage difference between the first electrode and the second electrode is not zero, the Bi-stable liquid crystal molecules are orderly deflected, light irradiated on the anti-glare device transmits through the anti-glare layer and is reflected by the reflector layer.

In order to realize an automatic control of anti-glare, the anti-glare device further comprises a photosensitive device (not shown in FIG. 1) and a control circuit connected with the photosensitive device, each of the first electrode 11 and the second electrode 12 is connected with the control circuit, current of the photosensitive device changes in a same direction as a light intensity sensed by itself, and the control circuit outputs a reverse pulse voltage with respect to an amplitude of the current of the photosensitive device. Generally, the photosensitive device generates a photocurrent based on light intensity sensed by itself, and the greater the sensed light intensity is, the larger the photocurrent is, thus the greater the voltage across two terminals of the photosensitive device is (for example, they are in an Exponential relationship). For example, when the photocurrent of the photosensitive device is large, the voltage across two terminals of the photosensitive device is large, at this time, the control circuit outputs a zero level pulse, thus the voltage difference between the first electrode 11 and the second electrode 12 is zero, an anti-glare function is switched on. When the photocurrent of the photosensitive device is small, the voltage across two terminals of the photosensitive device is small, at this time, the control circuit outputs a high level pulse, thus the voltage difference between the first electrode 11 and the second electrode 12 is not zero, an anti-glare function is switched off. Therefore, an automatic control of anti-glare can be realized depending on the light intensity sensed by the photosensitive device.

Optionally, the control circuit comprises a control chip and a relay connected with the control chip, an input terminal of the control chip is connected to the photosensitive device, an output terminal of the relay serve as an output terminal of the control chip, and the first electrode 11 or the second electrode 12 is connected to the output terminal of the relay. The control circuit can flexibly and effectively control the voltage output through the relay.

In the anti-glare device of this embodiment, the first electrode 11 and the second electrode 12 are formed of a transparent conductive material including indium tin oxide (ITO) material. By using the transparent conductive material, not only may power supply be realized, but also the travel of light will not be influenced, and display of a display screen (to which the anti-glare will be applied) will not be influenced.

Also, optionally, a thickness of the anti-glare layer 13 is in a range of 5-30 μm. With thus thickness range, an anti-glare effect can be ensured and a good light transmittance can be ensured as well.

The photosensitive device 18 may be a photosensitive resistor or a photosensitive diode (which is not shown in FIG. 1, but is shown in FIG. 3 and is indicated by a circle). An area of each of the photosensitive resistors or the photosensitive diodes is 2 μm*2 μm. By using the photosensitive resistor with small area, influence of the photosensitive resistor on the display effect of a display screen to be used in cooperation with it can be avoided. Here, the photosensitive resistor is only an example of the photosensitive device. Depending on application occasions, the photosensitive device 18 may be any of other structures such as a photosensitive CCD (Charge Couple Device) or a CMOS (Complementary Metal-Oxide Semiconductor) sensor, which is not limited herein.

It is easy to understand that, the anti-glare device has a first base 15 provided at an outer side of the first electrode 11, and when the reflector layer 19 is provided at an inner side of the second electrode 12, a second base 16 is provide at an outer side of the second electrode 12 (alternatively, when the reflector layer 19 is provided at an outer side of the second electrode 12, the second base 16 is provide at an outer side of reflector layer 19), so as to support and protect inner structural layers. Since the first base 15 and the second base 16 may be formed of a transparent material, there is no influence on the light, and thus they are not shown in subsequent figures.

Figure 2A:
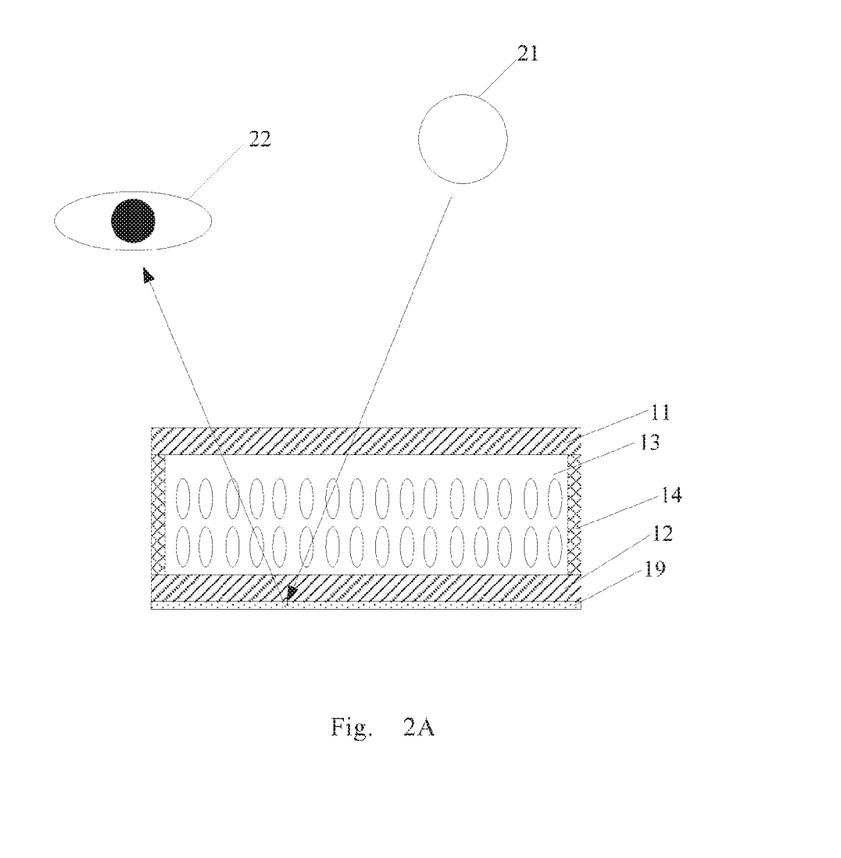
FIG. 2A and FIG. 2B are diagrams showing two operation modes of the anti-glare device in FIG. 1.
Figure 2B:
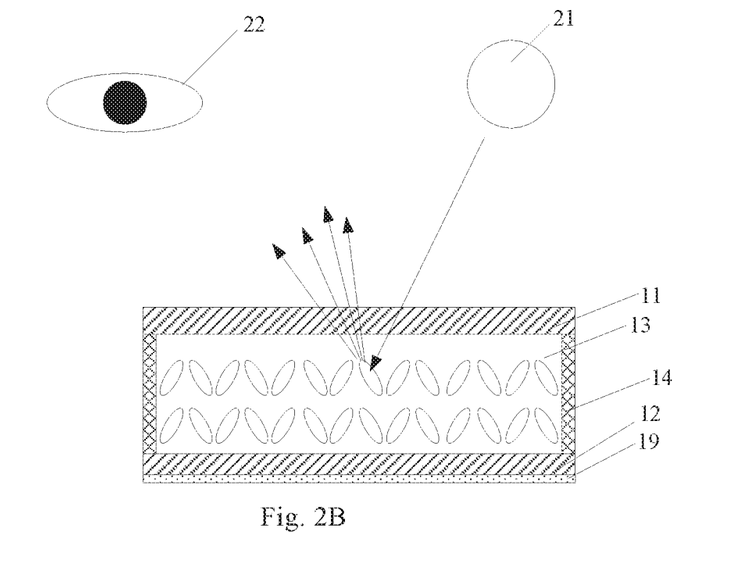

Taking a case that the multi-stable liquid crystal molecules serve as medium and are applied to a rearview mirror as an example, the operation principle of the anti-glare device in this embodiment is as follows:

Light from a light source 21 behind human eyes (the light source is substantially in front of the anti-glare device, that is, in front of the first electrode side) irradiates on the anti-glare device, based on the sensing of the irradiated light by the photosensitive device, if there is no intense light irradiated from rear of the human eyes, a voltage difference is generated between the first electrode 11 and the second electrode 12, which is equivalent to a case that a voltage is applied between the first electrode 11 and the second electrode 12, so that the multi-stable liquid crystal molecules deflect, at this time, the multi-stable liquid crystal molecules are in an ordered arrangement as shown in FIG. 2A, that is, in a completely transparent state, the light directly transmit through the orderly arranged multi-stable liquid crystal molecules and in turn is reflected by the reflector layer 19, the display effect will not be influenced. If there is an intense light irradiated from rear of the human eyes, no voltage difference is generated between the first electrode 11 and the second electrode 12, which is equivalent to a case that no voltage is applied between the first electrode 11 and the second electrode 12, at this time, the multi-stable liquid crystal molecules are in a disordered arrangement as shown in FIG. 2B, the light is scattered by the disordered multi-stable liquid crystal molecules in the anti-glare layer 13 and cannot enter into the human eyes 22, thus the human eyes can see back scenery. It can be seen that, in a case that there is no voltage is applied between the first electrode 11 and the second electrode 12, the light is scattered and thus no light reflected by the mirror enters into the human eyes, realizing the anti-glare effect, which is equivalent to switching on the anti-glare function.

In the anti-glare device in this embodiment, the multi-stable liquid crystal molecules or the Bi-stable liquid crystal molecules have a property of ordered arrangement during power on and disordered arrangement during power off, whether or not performing anti-glare function can be automatically switched, which is especially suitable for the anti-glare application of a rearview mirror.

Second Embodiment:

This embodiment provides an anti-glare device, which is different from that in the first embodiment in that it can perform an automatic partition control of anti-glare.

In the anti-glare device of this embodiment, based on incident angles of the irradiated light and areas for receiving light, one of the first electrode 11 and the second electrode 12 is preferably divided into N separate sub-electrodes (that is, N light receiving regions), and the other one of the first electrode 11 and the second electrode 12 is set as a common electrode. The anti-glare layer 13 is also divided into N adjustment regions corresponding to the N light receiving regions, each of the light receiving regions is provided therein with a photosensitive device 18, wherein N is a natural number larger than 1, as shown in FIG. 3. In the structure in which the electrode is divided into light receiving regions, deflection state of the liquid crystal molecules in each of the adjustment regions depends on the voltage of a sub-electrode corresponding to the adjustment region. By the above solution in which a partition control and a photosensitive control are performed, anti-glare control is preformed only on one or more regions on which the irradiated light have a intensity larger than a threshold, ensuring that a normal display may be performed in an area as large as possible.

Division of the N light receiving regions is not specifically limited here, and can be designed according to practical applications. Herein, areas of the N light receiving regions may be or not be the same, central regions and peripheral regions of the anti-glare device may be processed in a same manner or in different manners depending on view angles of eyes, so as to realize the normal display of the back scenery on an area as large as possible.

Optionally, photosensitive devices 18 for each light receiving region are uniformly distributed along boundaries of the light receiving region. The photosensitive devices 18 are provided at boundaries of the light receiving region and are close to the light receiving region to be controlled by them, and transmit the sensed photo signal to a control circuit so as to control the power supply to a corresponding sub-electrode, when performing anti-glare on a certain light receiving region, a correct light intensity of this light receiving region can be obtained so as to perform the anti-glare on the certain light receiving region.

Therefore, in a case that light is only irradiated on some light receiving regions of the anti-glare device, by means of the sensing of the photosensitive devices provided at boundaries of these regions, only multi-stable liquid crystal molecules in regions in which the irradiated light have light intensities larger than a set threshold maintain a disordered arrangement state, so that the light is scattered, on the other hand, the multi-stable liquid crystal molecules in other regions in which the irradiated light have light intensities no larger than the set threshold deflect to be parallel to each other, so that the light normally transmits therethrough and finally is reflected into the human eyes.

The operation principle of the anti-glare device in this embodiment is as follows:

When the light intensity is larger than the set threshold, the photosensitive device 18 changes (for example, resistance of the photosensitive device 18 changes), a relay in a control circuit is triggered to operate to switch the power supply on to supply power to the first electrode 11 or the second electrode 12, outputting a zero level pulse or a high level pulse, so that the liquid crystal molecules in the anti-glare layer 13 may be in an ordered arrangement or a disordered arrangement, so as to switch on or switch off the anti-glare function.

Other structures of the anti-glare device in this embodiment are the same as those corresponding structures in the first embodiment, descriptions of which will not be repeated here.

In the anti-glare device in this embodiment, the multi-stable liquid crystal molecules or the Bi-stable liquid crystal molecules have a property of ordered arrangement during power on and disordered arrangement during power off, whether or not performing anti-glare function can be automatically switched, and an automatic partition control may be realized as well, which is especially suitable for the anti-glare application of a rearview mirror.

Third Embodiment:

This embodiment provides an anti-glare device, which is different from those in the first embodiment and the second embodiment in that it can perform an automatic timing control of anti-glare.

In some applications, the anti-glare device may further comprise a timer, which may be connected to the relay of the control circuit, for switching off the relay after the relay continues to operate for a set time period, for example, the relay is switched off after a delay of 2 s after the light intensity sensed by the photosensitive device is lowered. The timer plays a role of controlling the anti-glare time so as to better control the duration of anti-glare.

Optionally, the time period of the timer is in a range of 3-10 s. Furthermore, the timer switches the relay off after a delay of 1-4 s after the relay continuously supplies power for the set time period. Based on the duration of the light intensity, the duration control or the delay time control of anti-glare can be realized by the timer. In addition, after the intense light disappears, the anti-glare function is kept for a time period, the anti-glare effect is prolonged, facilitating restoration of the vision of the human eyes, so as to prevent occurrence of visual blind spot due to irradiation of another intense light from a rear vehicle on the rearview mirror during the delay time.

The operation principle of the anti-glare device in this embodiment is as follows:

When the light intensity is larger than the set threshold, the photosensitive device 18 changes (for example, resistance of the photosensitive device 18 changes), a relay in a control circuit is triggered to operate to switch on the power supply to supply power to the first electrode 11 or the second electrode 12, at this time, the timer starts to time, when the set time period expires, the control circuit is triggered to stop supplying power to the first electrode 11 or the second electrode 12, outputting a pulse voltage, so that the liquid crystal molecules in the anti-glare layer 13 may be in a disordered arrangement or deflect by a corresponding angle, so as to switch on or switch off the anti-glare function.

Other structures of the anti-glare device in this embodiment are the same as those corresponding structures in the first embodiment, descriptions of which will not be repeated here.

In the anti-glare device in this embodiment, the multi-stable liquid crystal molecules or the Bi-stable liquid crystal molecules have a property of ordered arrangement during power on and disordered arrangement during power off, whether or not performing anti-glare function can be automatically switched, and an automatic time control of anti-glare may be realized as well, which is especially suitable for the anti-glare application of a rearview mirror.

Fourth Embodiment:

This embodiment provides a rearview mirror, which comprises the anti-glare device in any one of the first embodiment to the third embodiment.

The rearview mirror is configured to reflect a rear object, and adopts the anti-glare device having the automatic anti-glare adjustment function, which has a better rearview anti-glare effect, especially can effectively prevent the driver from producing visual blind spot due to intense light irradiated from a rear vehicle, ensuring a night drive safety.

Fifth Embodiment:

This embodiment provides a rearview mirror, which further comprises a display screen 3, the anti-glare device is provided at a display side of the display screen 3, that is, the anti-glare device is provided in front of the display screen 3.

Figure 4:
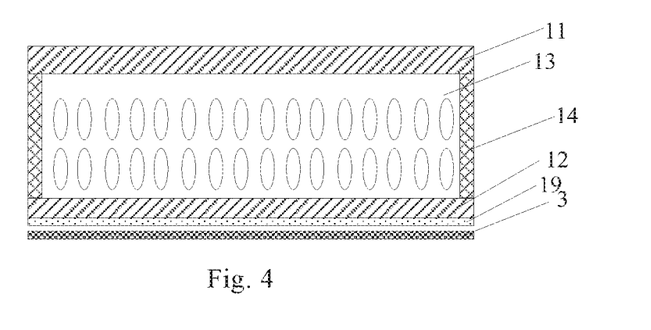
FIG. 4 is structural diagram of a rearview mirror of a fifth embodiment in the present disclosure.

As shown in FIG. 4, the display screen 3 may be a liquid crystal display (LCD) or an organic light-emitting diode (OLED) display, and is configured to clearly display the back scenery. Depending on the usage of light source, LCDs may be divided into a transflective mode and a transmissive mode, light transmits through the transflective material or the transparent material, then transmits through the anti-glare device to achieve display effect, avoiding distortion of an image viewed by the driver. In this case, the rearview mirror may also display a navigation map or other graphics, which has a high functional integration.

Figure 5A:
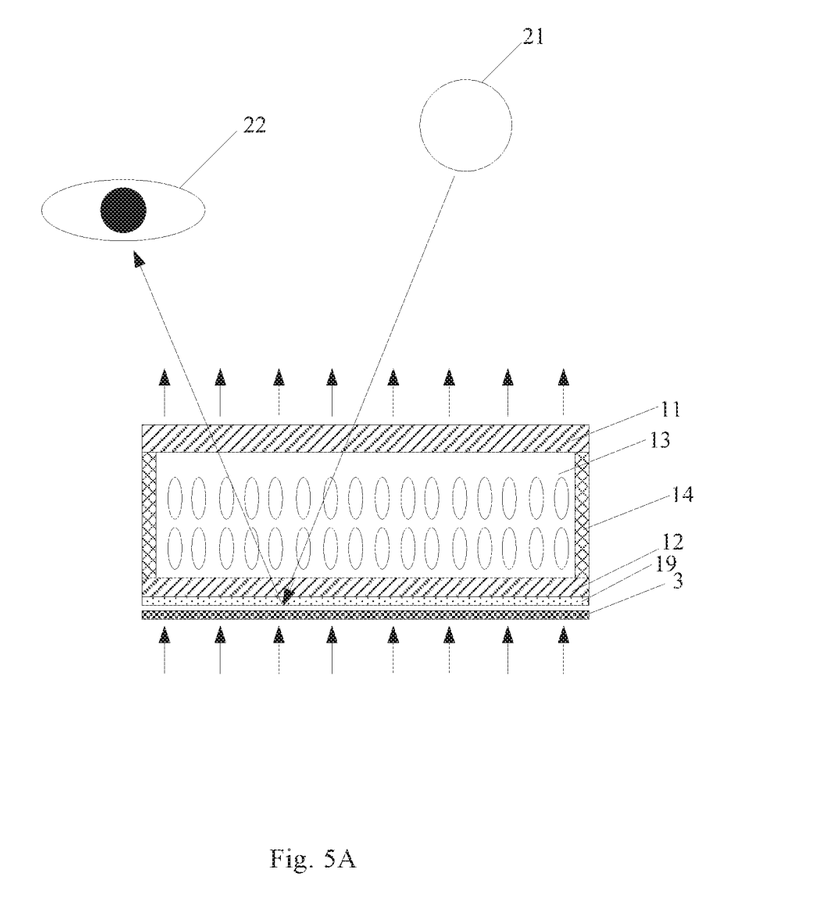
FIG. 5A and FIG. 5B are diagrams showing two operation modes of the anti-glare device in FIG. 4.
Figure 5B:
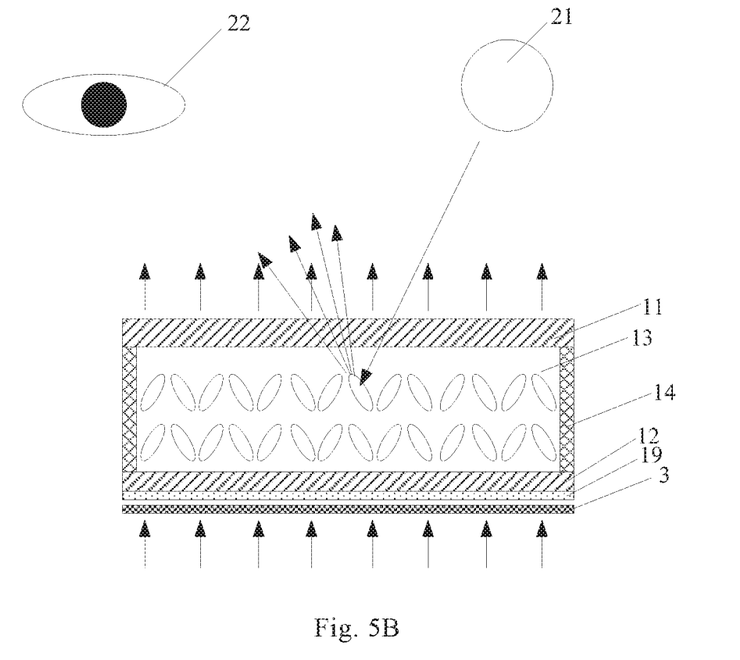

The operation principle of the anti-glare device is the same as those in the first embodiment to the third embodiment. As shown in FIG. 5A and FIG. 5B, the light (which is indicated by arrows below the display screen 3 by way of illustration only and may be emergent light from the LCD or LED) from the display screen 3 can transmit through the anti-glare device to enter into the human eyes, ensuring the display effect of the displayed image.

It should be understood that, the anti-glare device in any one of the first embodiment to the third embodiment may be used as the rearview mirror in the fourth embodiment, and is configured to reflect the back scenery. Moreover, the rearview mirror may be added with a display screen 3 as needed to have a display function for displaying a map or navigating. Therefore, the rearview mirror may only have a rearview anti-glare function, or may have a display and rearview anti-glare function, which can be flexibly configured according to the application occasion or estimated cost.

The reflector layer 19 in this embodiment includes reflector blocks and transmittance blocks which are provided in a same layer and spaced, the reflector blocks are capable of reflecting light irradiated thereon, and the transmittance blocks are capable of transmitting light irradiated thereon, thus light emerged from the display screen 3 can transmit through the reflector layer 19 and in turn transmit through the anti-glare device to enter into the human eyes, so that the driver can view the image displayed on the display screen 3. Optionally, the reflector blocks and the transmittance blocks may be formed by discontinuously evaporating metal material to realize transflective function, or may be formed of polymer material to realize transflective function.

The anti-glare device adopted by the rearview mirror has a function of automatic anti-glare adjustment, has a higher integration and a better rearview anti-glare effect, especially can effectively prevent the driver from producing visual blind spot due to intense light irradiated from a rear vehicle, ensuring a night drive safety.

It should be understood that, the foregoing embodiments are only exemplary embodiments used for explaining the principle of the present invention, but the present invention is not limited thereto. Various variations and improvements may be made by a person skilled in the art without departing from the protection scope of the present invention, and these variations and improvements also fall into the protection scope of the present invention.

The invention claimed is:

1. An anti-glare device comprising:
a first electrode and a second electrode configured to be opposite to each other;
an anti-glare layer provided between the first electrode and the second electrode; and
a reflector layer provided on the second electrode,
a photosensitive device and a control circuit connected with the photosensitive device, each of the first electrode and the second electrode is connected with the control circuit, current of the photosensitive device changes in a same direction as a light intensity sensed by the photosensitive device, and the control circuit outputs a reverse pulse voltage with respect to an amplitude of the current of the photosensitive device, wherein
the anti-glare layer comprises a plurality of deflection molecules, which are capable of switching between an ordered deflection and a disordered arrangement when different voltage differences are applied between the first electrode and the second electrode; and
the reflector layer is configured to reflect a light passing through the first electrode and transmitting through the anti-glare layer, and wherein
the control circuit comprises a control chip and a relay connected with the control chip, an input terminal of the control chip is connected to the photosensitive device, an output terminal of the relay serve as an output terminal of the control chip, and the first electrode or the second electrode is connected to the output terminal of the relay.

2. The anti-glare device of claim 1, wherein when the voltage difference between the first electrode and the second electrode is zero, the deflection molecules are in a disordered arrangement, light irradiated on the anti-glare device is scattered; when the voltage difference between the first electrode and the second electrode is not zero, the deflection molecules are orderly deflected, light irradiated on the anti-glare device transmits through the anti-glare layer and is reflected by the reflector layer.

3. The anti-glare device of claim 2, wherein the deflection molecules are Bi-stable liquid crystal molecules.

4. The anti-glare device of claim 2, wherein the deflection molecules are multi-stable liquid crystal molecules, and the greater the voltage difference between the first electrode and the second electrode is, the greater the deflection angles of the multi-stable liquid crystal molecules are.

5. The anti-glare device of claim 1, wherein the first electrode is divided into a plurality of separate light receiving regions, and the anti-glare layer is divided into a plurality of adjustment regions corresponding to the light receiving regions, each of the light receiving regions is provided with a photosensitive device, and the control circuit is configured to control the deflection molecules in the plurality of adjustment regions individually.

6. The anti-glare device of claim 5, wherein a plurality of photosensitive devices are provided for each of the light receiving regions, and the plurality of photosensitive devices are uniformly arranged at boundaries of the light receiving region.

7. The anti-glare device of claim 1, further comprising a timer, which is connected with the relay and configured to switch the relay off after the relay continuously supplies power for a set time period.

8. The anti-glare device of claim 7, wherein the set time period of the timer is in a range of 3-10 s.

9. The anti-glare device of claim 7, wherein the timer switches the relay off after a delay of 1-4 s after the relay continuously supplies power for the set time period.

10. The anti-glare device of claim 1, wherein the reflector layer comprises reflector blocks and transmittance blocks which are provided in a same layer and spaced, and the reflector layer is provided on any surface of the second electrode.

11. The anti-glare device of claim 1, wherein the photosensitive device is a photosensitive resistor.

12. The anti-glare device of claim 11, wherein an area of the photosensitive resistor is 2 μm*2 μm.

13. The anti-glare device of claim 1, wherein the first electrode and the second electrode are formed of a transparent conductive material.

14. The anti-glare device of claim 13, wherein the transparent conductive material includes indium tin oxide.

15. The anti-glare device of claim 1, wherein a thickness of the anti-glare layer is in a range of 5-30 μm.

16. A rearview mirror comprising the anti-glare device of claim 1.

17. A rearview mirror comprising the anti-glare device of claim 10.

18. The rearview mirror of claim 17, further comprising a display screen, wherein the anti-glare device is provided at a display side of the display screen.

* * * * *